(No Model.) 2 Sheets—Sheet 1.
J. C. TENNENT.
VELOCIPEDE.
No. 292,708. Patented Jan. 29, 1884.
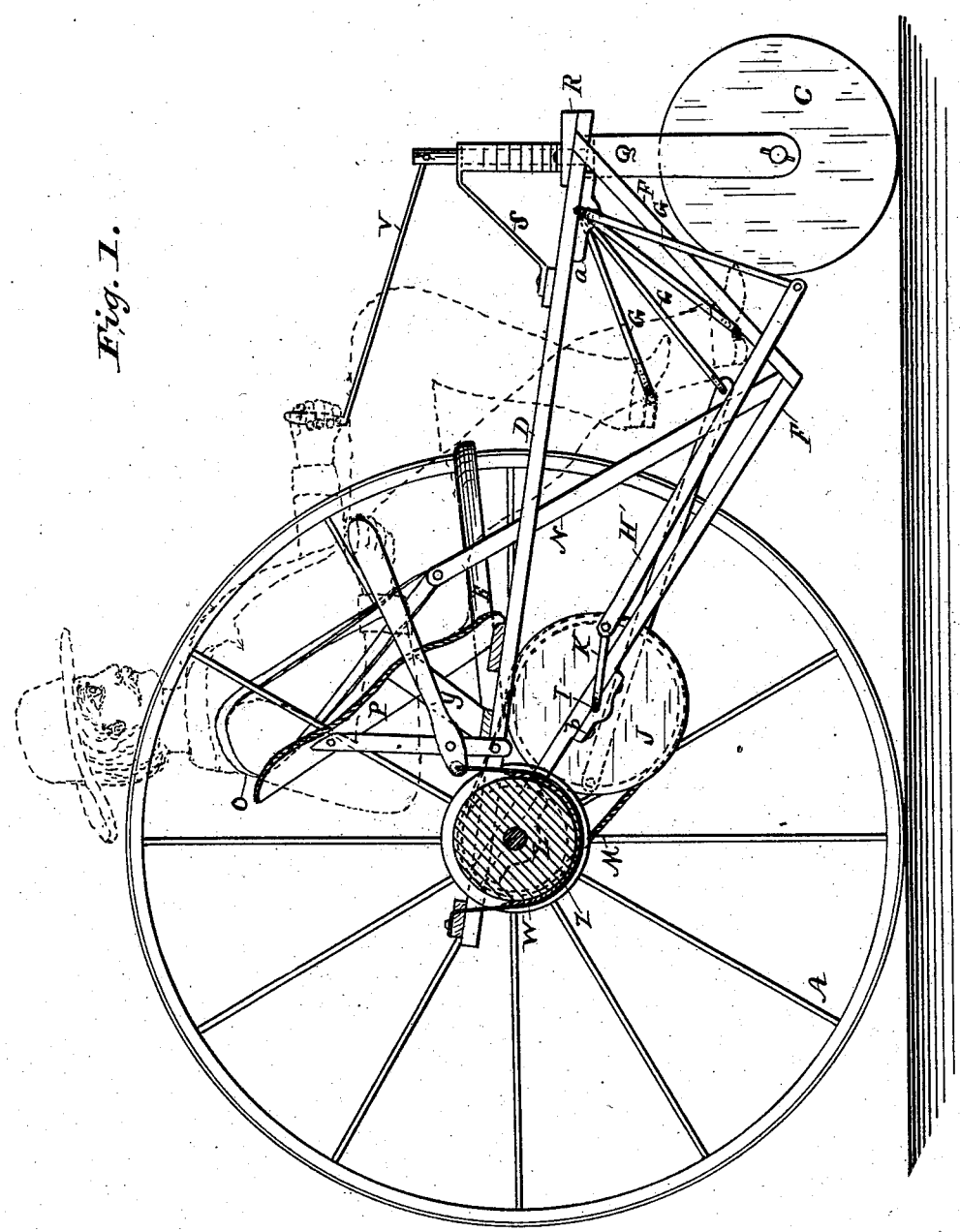
Fig. I.
Witnesses:
John A. Johnson
U. P. Caflan
Inventor:
John Courtois Tennent
N. PETERS. Photo-Lithographer, Washington, D. C.

(No Model.) 2 Sheets—Sheet 2.
J. C. TENNENT.
VELOCIPEDE.
No. 292,708. Patented Jan. 29, 1884.
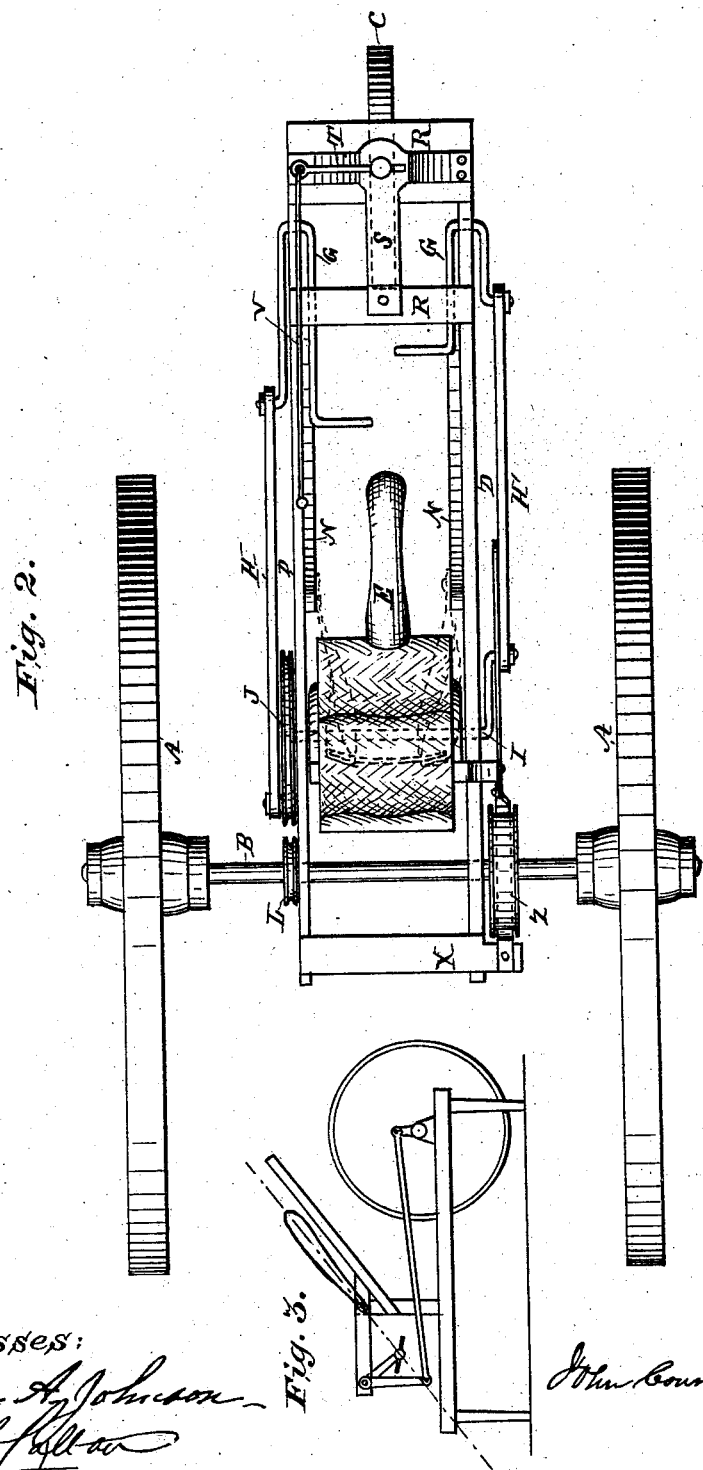
Witnesses:
John A. Johnson
Inventor:
John Courtois Tennent

UNITED STATES PATENT OFFICE.

JOHN COURTOIS TENNENT, OF GLYNDON, MARYLAND.

VELOCIPEDE.

SPECIFICATION forming part of Letters Patent No. 292,708, dated January 29, 1884.

Application filed May 28, 1883. (No model.)

*To all whom it may concern:*

Be it known that I, JOHN C. TENNENT, a citizen of the United States, residing at Glyndon, in the county of Baltimore and State of Maryland, have invented certain new and useful improvements in motors for propelling land and water conveyances, and also for driving mechanism of all kinds, of which the following is a specification.

The object of my invention is to increase the power expended by the feet upon the treadles in operating any machine by gaining the resistance of the shoulders upon some part of the frame in the line of the direction of the stroke of the feet through the central line of the body.

Referring to the drawings, Figure 1 is a longitudinal vertical section of a tricycle, showing my improved motor attached thereto. Fig. 2 is a top or plan view of the machine shown in Fig. 1. Fig. 3 is a side view of my device applied as a motor for driving mechanism of any kind.

In Figs. 1 and 2 I have thought it proper to show my motor as applied to a tricycle or other wheeled vehicle which is propelled by the rider.

I will now proceed to describe my invention with reference to these figures.

A indicates the wheels, and B the axle connecting the same, and C the front or steering wheel, all of which are of the ordinary construction, the rear and front wheels being connected together by reaches or pieces D D, and to which the seat E, together with the levers by which the machine is propelled, is secured. The front and rear wheels are also connected together and strengthened by the truss or brace bars F F.

G G are bent levers, secured in bearings *a* in the pieces D. The inner ends of these levers are bent so as to form treadles or foot-supports for the operator, while the outer ends of said levers are connected to the pitmen H and H'.

I is a shaft mounted in suitable bearings, *b*, in the brace or truss F, to one end of which is secured a pulley-wheel, J, while the other end is pivoted with a crank-arm, K, to which the pitman H' is secured, the other pitman, H, being secured to the pulley-wheel J.

L is a pulley-wheel rigidly secured to the axle B, which is connected to the pulley-wheel J by means of a belt, M, and through which instrumentalities power is applied to the axle to propel the vehicle.

The pulleys J and L may be made in the form of sprocket-wheels, connected by a sprocket-chain, as is the common method in this class of machines.

N N are two uprights secured to the brace-bars F, and also to the reaches or connecting-bars D D, to the upper end of which are secured the straps or yokes O O, which are designed to be placed over the shoulders of the operator to hold him in place and utilize the muscular action of the body as well as its weight, to assist the power of the legs and feet upon the treadles, and gain the resistance of the shoulders upon some part of the frame of the body of the operator in the line of direction of the stroke of the feet and through the central line of the body. This is an important feature of my invention, as it enables the operator to concentrate and control the muscles of the body, to propel the machine to a much better advantage, and without severe straining and tiring of the body.

P is the back of the seat, which may be inclined at any angle; but a line or angle which will bring the body on a line with the legs when they are exerting their power on the treadles is preferred.

Q is a bracket or yoke pivoted in the front timbers of the machine, to which the front or steering wheel is secured, the upper end of which is secured to the reaches D by a cross-piece, R, and the brace-rod S. The upper end of the yoke Q is provided with a cross-bar or pin, T, to which is secured the steering-rod V, which extends back within reach of the operator, and by which means the vehicle is guided or directed in its course.

W is a band of metal or other suitable material, one end of which is secured to the cross-bar X, while the other end is secured to the pivoted bar or lever Y. The band or strap passes around a drum, Z, which is rigidly secured to the axle B, so that by depressing the long arm of the lever Y, which is near the hand of the operator, the strap or band will be brought in close contact with the drum Z, and thus act as a brake to stop the machine or retard its forward motion.

In Fig. 3 I have shown my foot and shoulder motor as applied to the driving of a fly or balance wheel, from which power may be transmitted to mechanism of various kinds for driving lathes, sawing wood, operating a churn, propelling boats, &c.

The operation of my device is as follows: The operator takes his place on the seat E, places his feet on the treadles or bent levers G G, and by simply oscillating them back and forth, like the pendulum of a clock, rotary motion is imparted to the shaft I through the medium of the pitmen or connecting-rods H and H', and from thence to the axle B by means of the belt or sprocket-chain M.

I do not confine myself to the use of the oscillating levers G G to transmit the power of the feet to the pitmen H and H', but may employ other equivalent devices for this purpose—as the ordinary double-cranked tricycle-shaft, to which the feet are applied, producing a rotary motion to the cranks, on the outer ends of which the pitmen may be attached; or, by having one end of the pedal to inclose and work loosely along a side parallel rod, secured at either end to the frame, in the line of direction of the body, to each of which pedals one end of the pitman is attached, the feet thus working along a straight line, or by any other similar device for accomplishing the same purpose.

Heretofore, in machines constructed for obtaining this resistance of the shoulders, dependence has been placed upon a single transverse bar or strap secured at the sides to the frame, which should afford this resistance to the shoulders or back. This plan has been found objectionable in practice, for the reason that when the power of the feet and legs is exerted in a direct line of the body the shoulders, from having nothing to restrain them in position, have risen off the bar, and the resistance consequently ceases; also, where straps, braces, or yokes have encircled the shoulders, having their ends attached to some part of the frame in the rear, these have been found objectionable from their want of efficiency in applying to the treadles the full power exerted by the feet and legs, for the reason that the line of resistance of the shoulders to the frame was not made rigidly in the direction of the shoulders and feet, in which line alone could the full muscular power of the feet and legs be exerted. This want of efficiency is evident from the construction of the toggle or knee joint in mechanics used in power-presses for stamping coin, &c., the principle of which I have in view in my invention, which by a slight expenditure of strength obtains immense power, and which demands the bringing into the direct line of their extremities two levers, which are jointed together, the upper extremity being jointed to a fixed part of the frame, while the end of the lower moves vertically downward along that line to stamp the coin. By not following implicitly this principle of the toggle or knee joint, the attachments of the straps, braces, or yokes, though placed to the rear, have uniformly made an angle greater or less with that line of the body and feet, with consequent loss of power, and entailing greater muscular exertion to make them at all efficient as motors, which resulted in their failure. For these reasons I consider it highly important to confine the line of resistance rigidly to one that passes through the shoulders, hips, and feet, obtaining thereby the maximum effect of muscular power with the minimum of fatiguing exertion.

I am aware that it is not broadly new to resist the back-thrust of the body caused by the action of the feet on the treadles by yokes or shoulder-straps passing over the shoulders and secured to the machine at a point which brings the line of resistance away from a direct line through the shoulders and feet, and such I do not claim.

Having thus described my invention, what I claim, and desire to secure by Letters Patent, is—

1. A motor for velocipedes, tricycles, and for driving all kinds of mechanism, consisting of one or more treadles to be operated by the feet, said treadles being connected to the intermediate mechanism in substantially the manner described, and straps, yokes, or braces placed around the shoulders or connected to the body of the operator and to the body of the machine in a line direct through shoulders and feet, whereby a resistance to the power exerted by the feet and legs on the treadles is obtained in a direct line of the body and feet, as set forth.

2. The combination, in a motor for velocipedes and other purposes, of one or more treadle-levers connected to the pitmen and to the intermediate and driving mechanism, as set forth, with the bars N and straps or yokes O, all arranged to operate in direct line of body through shoulders and feet in the manner set forth.

3. The combination, with the frame of a velocipede or other motor, of a shoulder brace or yoke attached to the frame, and adapted to be placed over the shoulders of the operator and to lie in a line parallel with the length of the body of the operator and in a direct line through the shoulders, hips, and feet, substantially as and for the purpose set forth.

4. The combination of the bent treadle-levers mounted in the reaches D, and adapted to be oscillated by the feet of the operator, with the pitmen H and H', shaft I, belt M, and axle B, as and for the purpose set forth.

In testimony that I claim the foregoing I have hereunto set my hand.

JOHN COURTOIS TENNENT.

Witnesses:
JOHN A. JOHNSON,
M. P. CALLAN.